United States Patent [19]

Browning et al.

[11] Patent Number: 5,360,283

[45] Date of Patent: Nov. 1, 1994

[54] PRELOAD-CLAMPNUT DEVICE

[75] Inventors: David M. Browning; Thomas J. Garnier, both of Portland, Oreg.

[73] Assignee: Shredding Systems, Inc., Wilsonville, Oreg.

[21] Appl. No.: 951,171

[22] Filed: Sep. 24, 1992

[51] Int. Cl.⁵ .............................................. F16B 7/00
[52] U.S. Cl. .................................. 403/374; 403/371; 403/261
[58] Field of Search ............... 403/371, 370, 259, 261, 403/374; 241/295

[56] References Cited

U.S. PATENT DOCUMENTS

| | | | |
|---|---|---|---|
| 1,151,119 | 8/1915 | Newhouse | 241/295 |
| 1,265,501 | 5/1918 | Payzant | 403/371 |
| 2,043,272 | 6/1936 | Wallgren | 403/370 |
| 2,622,120 | 12/1952 | Knasko | 403/370 |
| 3,257,070 | 6/1966 | Kuklinski | 403/371 X |
| 3,845,907 | 11/1974 | Schwartz. | |
| 4,004,499 | 1/1977 | Beck | 403/261 X |
| 4,019,824 | 4/1977 | Percy | 403/371 |
| 4,043,692 | 8/1977 | Hund | 403/370 |
| 4,136,989 | 1/1979 | Bianco | 403/261 |
| 4,316,678 | 2/1982 | F'Geppert | 403/370 |
| 4,557,621 | 12/1985 | Mullenberg | 403/370 |
| 5,083,889 | 1/1992 | Steinbock | 403/370 |
| 5,174,680 | 12/1992 | Nakamura | 403/371 |

FOREIGN PATENT DOCUMENTS

| | | | |
|---|---|---|---|
| 220223 | 11/1985 | Japan | 403/259 |
| 1229389 | 4/1971 | United Kingdom | 403/259 |

Primary Examiner—Randolph A. Reese
Assistant Examiner—Anthony Knight
Attorney, Agent, or Firm—Chernoff, Vilhauer, McClung & Stenzel

[57] ABSTRACT

A preload-clamp nut device is provided which securely mounts to a shaft having a plurality of shaft-mounted tools and provides a preload against the tools. A preferred embodiment of the device comprises a sleeve with a threaded bore and a slitted, tapered surface and a flange having a plurality of threaded holes, a clamp ring having a tapered bore and a plurality of openings that can be aligned with the plurality of threaded holes in the flange, and a plurality of bolts each having a set nut and a lock nut. When the bolts are inserted through the openings in the clamp ring into the threaded holes in the flange the set nuts and bolts can be tightened to clamp onto the shaft and preload the shaft-mounted tools. An alternative embodiment of the present invention provides a flange having a two-portion bore with a tapered portion and a constant diameter portion and a plurality of threaded holes, and a multipiece lockring having beveled edges that fit into the flange's tapered bore portion. A groove in a shaft receives the lockring. Bolts can be inserted into the flange's threaded holes and tightened to provide a preload on tools mounted onto the shaft. The preload is resisted by the groove-mounted lockring which prevents exodus of the flange from the shaft.

16 Claims, 4 Drawing Sheets

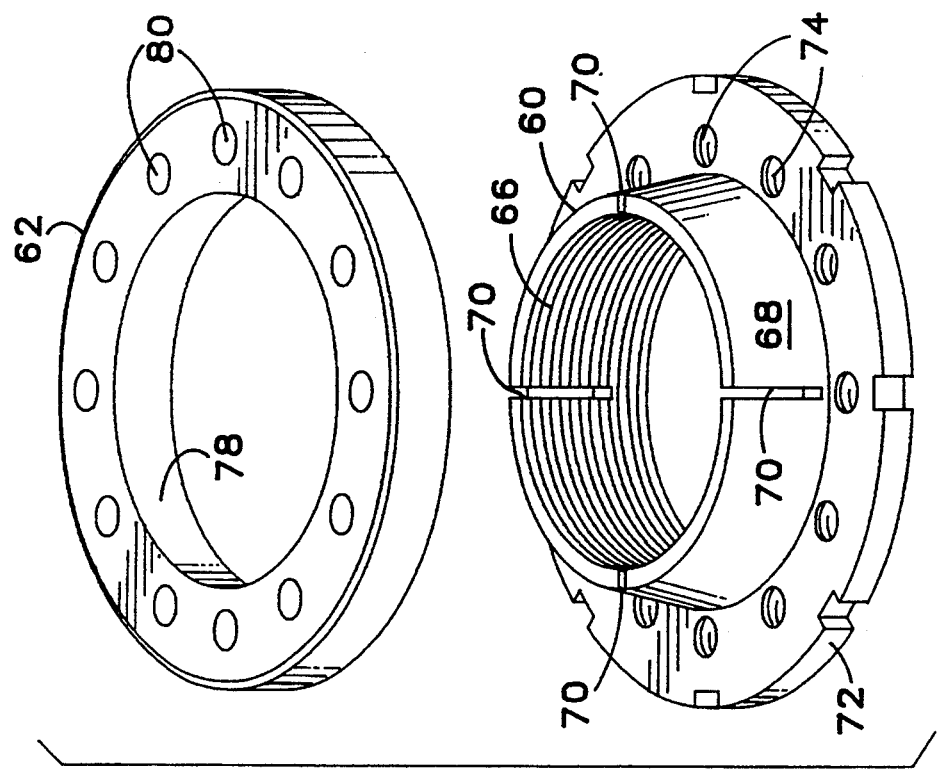
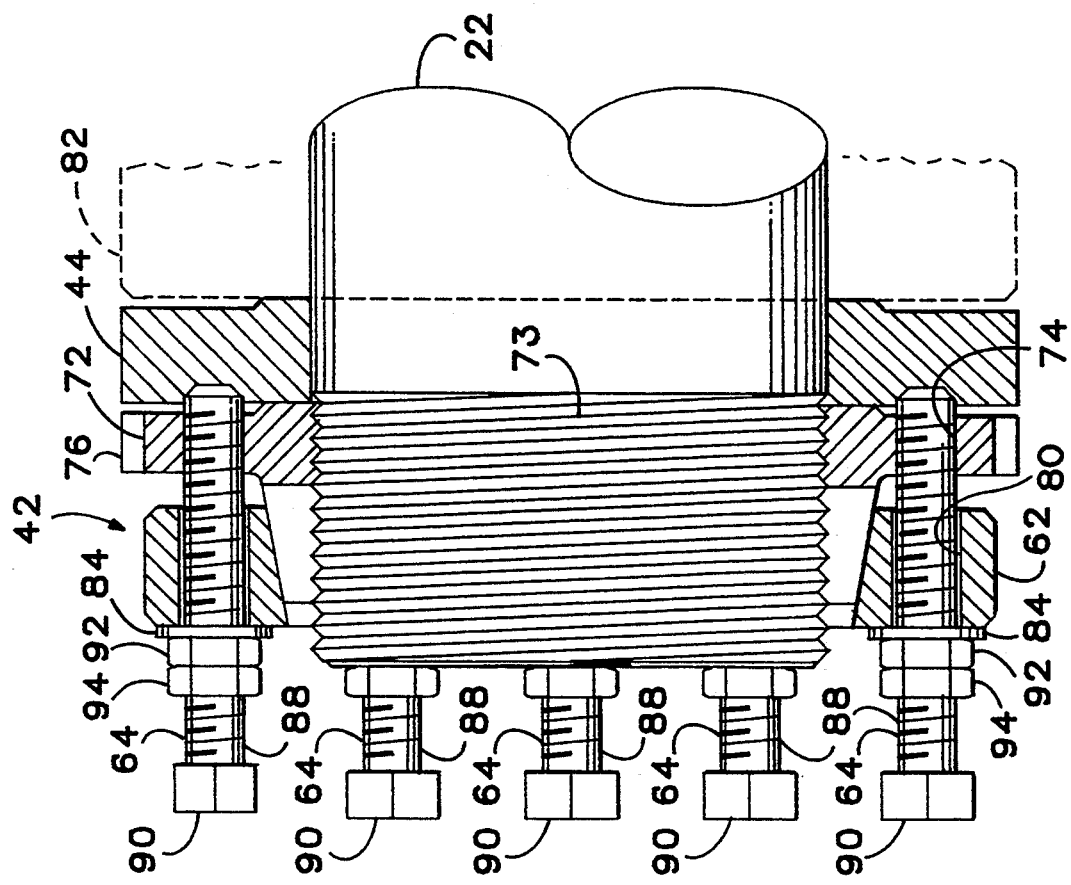

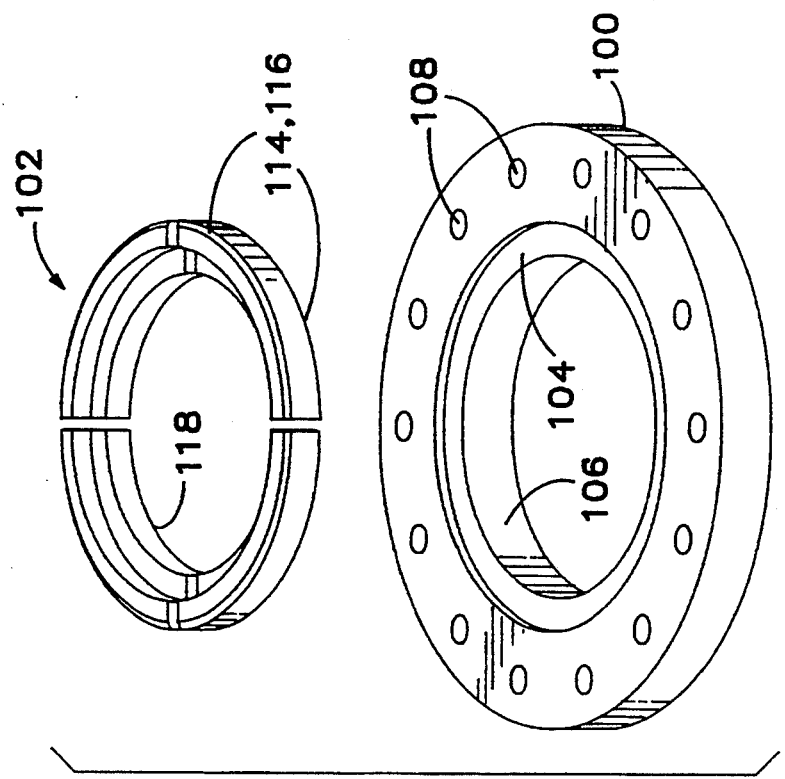
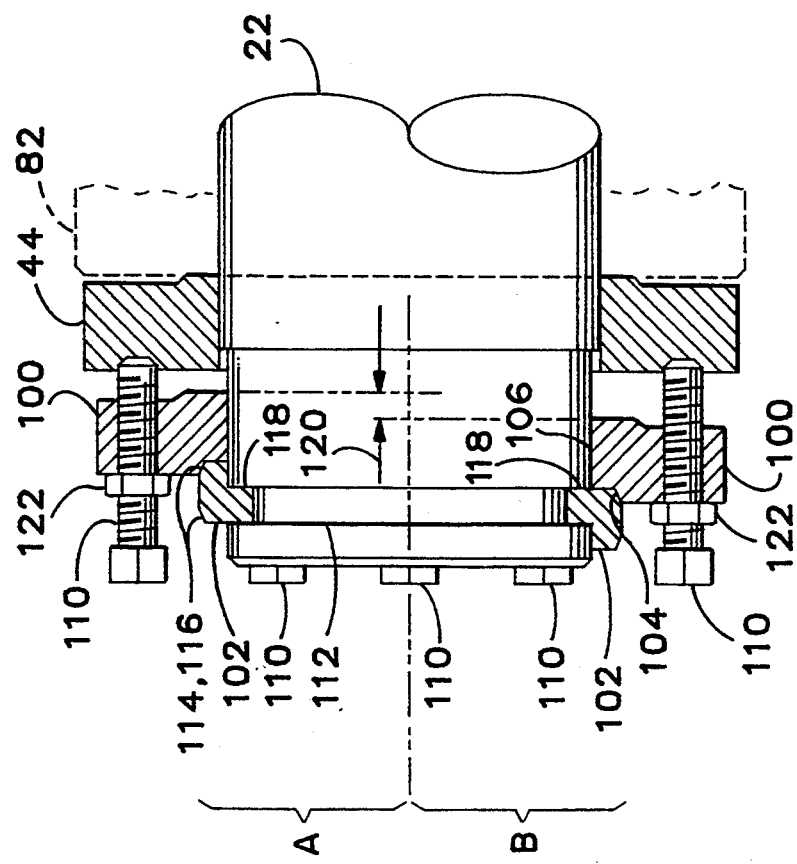
Fig. 6
Fig. 5

PRELOAD-CLAMPNUT DEVICE

BACKGROUND OF THE INVENTION

1. Field of the Invention

This invention pertains to the field of shaft-mounted tools and more particularly pertains to the field of comminuting machines comprising parallel shafts rotating in opposite directions and having comminuting blades mounted thereon for shredding solid waste product.

2. Description of the Related Art

Comminuting machines that shred and pulverize various types of trash typically include two parallel, elongate shafts having a plurality of comminuting blades mounted onto, and rotating with, them. The shafts rotate in opposite directions so that trash deposited between the shafts is grabbed by the comminuting blades, pulled through, shredded, and deposited below. When the trash consists of hard objects such as metal, wood or rock, the forces generated within the comminuting machine are extremely high and cause severe loads on the comminuting blades, shafts, and mounting hardware. The severe loads lead to numerous problems in comminuting machine design: most relevant to the present invention are the loads due to longitudinal forces that tend to displace the comminuting blades along the longitudinal axes of the shafts and transverse forces that tend to bow the shafts outward. The longitudinal forces may cause the comminuting blades to move and interfere with one another reducing efficiency and blade life. To counteract the effect of the longitudinal forces it is known to preload the blades along the length of the shaft so that the blades on a given shaft are tightly compressed against one another and maintain their operating position. It is also known to counteract the transverse forces with a lateral support finger that is rigidly mounted to the frame and presses against a shaft-mounted spacer to resist lateral bowing of the shaft.

Schwarz, U.S. Pat. No. 3,845,907, discloses an apparatus for comminuting trash having oppositely-rotating parallel shafts with comminuting blades that interact. Schwarz discloses pressure rings that axially pretension the entire arrangement of blade groups on a shaft which aids in reducing the longitudinal displacement of the comminuting blades. However, it has been found that the pressure rings to not adequately prevent axial displacement of the blades when exposed to the severe loads that arise when comminuting certain types of trash product such as metal, wood and rock.

The greater of these two problems associated with comminuting machines is the transverse forces that bow the shafts. To aid in understanding the problems generated by the bowed shaft, FIG. 1 is provided which exaggerates the bowing of the shaft for purposes of illustration. FIG. 1 shows a shaft 10 and a plurality of comminuting blades 12 and spacers 14. As stated, under severe conditions there is a transverse force inducing the shaft 10 to bow. Prior art comminuting machines provided a lateral support finger 16 to resist the bowing of the shaft and also to clean pulverized trash from the spacers 14. However, it was found that the lateral support finger could not provide sufficient lateral force to resist all bowing of the shaft because of the high forces involved. When the shaft 10 bows the comminuting blades and spacers 14 fan out creating spaces 18 between the comminuting blades 12 and spacers 14. Comminuted trash infiltrates the spaces 18 which then induces significant longitudinal forces as the shaft rotates.

What is needed, then, is a means of counteracting the longitudinal and traverse forces associated with comminuting apparatus and thus prevent longitudinal movement of the comminuting blades and bowing of the shaft.

SUMMARY OF THE INVENTION

The present invention solves the above problems by providing a device that both clamps the comminuting blades securely to the rotating shaft and provides a preload force against the comminuting blades of sufficient force to prevent all longitudinal movement of the blades. A surprising consequence of providing a preload of sufficient force is that the bowing of the shaft is eliminated because the comminuting blades and spacers perform as unitary portions of a shaft. And because the blades and spacers are diametrically larger than the shaft, the effect of the high-force preload is to cause the blades and spacers to perform as a large diameter shaft with regard to bending loads.

A preferred embodiment of the present invention comprises a sleeve, clamp ring and bolts. The sleeve has a constant diameter bore and a tapered surface and further has a flange with a plurality of threaded holes. The clamp ring has a tapered bore that mates compatibly with the sleeve's tapered surface and has a plurality of holes that align with the sleeve's threaded holes. A plurality of bolts load the clamp ring against the sleeve and simultaneously clamp the device to the shaft and provide a preload against shaft-mounted blades.

The tapered sleeve has a threaded bore which is threaded onto a threaded portion of the shaft snugly against the comminuting blades or an intermediate bearing. Thereafter the clamp ring is placed over the tapered sleeve and the bolts are inserted through the holes in the clamp ring and threaded into the threaded holes in the flange of the sleeve. The bolts are each provided with a set nut and a locking nut. After the bolts have been inserted, the set nuts may be turned to tighten the clamp ring against the tapered sleeve which circumferentially compresses the sleeve causing it to securely grip the threaded portion of the shaft. Thereafter, while holding the set nut in position relative to the clamp ring, the bolt may be turned to create a preload against the adjacent shaft-mounted member. After the preload has been established the lock nut is secured against the set nut to fix the device into position.

An alternative embodiment of the present invention comprises a nonthreaded shaft having a circumferential groove, a flange and a multipiece lockring. The flange has a bore with a tapered portion and a nontapered portion which slides onto the shaft. The flange has a plurality of threaded holes that receive a plurality of threaded bolts. The multipiece lockring fits into, and protrudes from, the groove in the shaft. The outer, circumferential edges of the lockring are beveled to provided tapered surfaces that fit into the tapered portion of the flange bore. When the bolts are threaded through the flange they impinge upon a shaft-mounted tool which causes the flange to slide back until it abuts the groove-mounted lockring. Further threading of the bolts preload the shaft-mounted tools as the lockring provides a reaction force.

It is an object of the present invention to provide a preload clamp nut device that securely attaches to an elongate shaft and provides a substantial load against a member on the shaft.

It is an object of the present invention to provide a clamp nut device that securely attaches to an elongate shaft to prevent an exodus of shaft-mounted tools.

It is an object of the present invention to provide a preload device for providing a preload against a shaft-mounted tool.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 3 is a cross section of the invention shown in FIG. 2, at an enlarged scale.

FIG. 4 is a perspective view of the invention shown in FIG. 2, at an enlarged scale.

FIG. 5 is a cross section of an alternative embodiment of the present invention.

FIG. 6 is a perspective view of a flange and lockring of the alternative embodiment of FIG. 5.

DETAILED DESCRIPTION OF THE PREFERRED EMBODIMENTS

Figure 1:
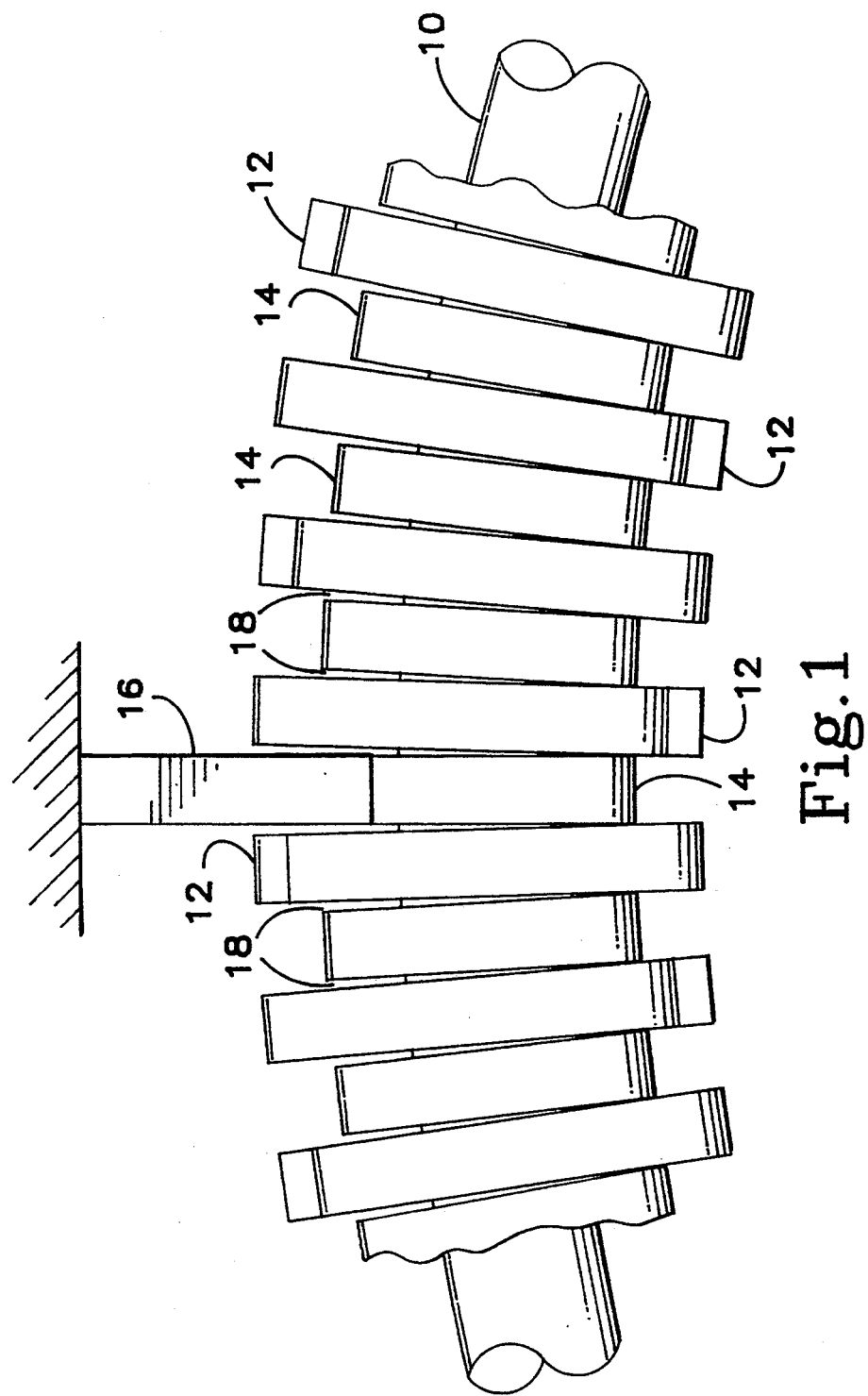
FIG. 1 is a top view of a portion of a prior art shaft with comminuting blades showing exaggerated bending for the purpose of illustrating the problems herein described.
Figure 2:
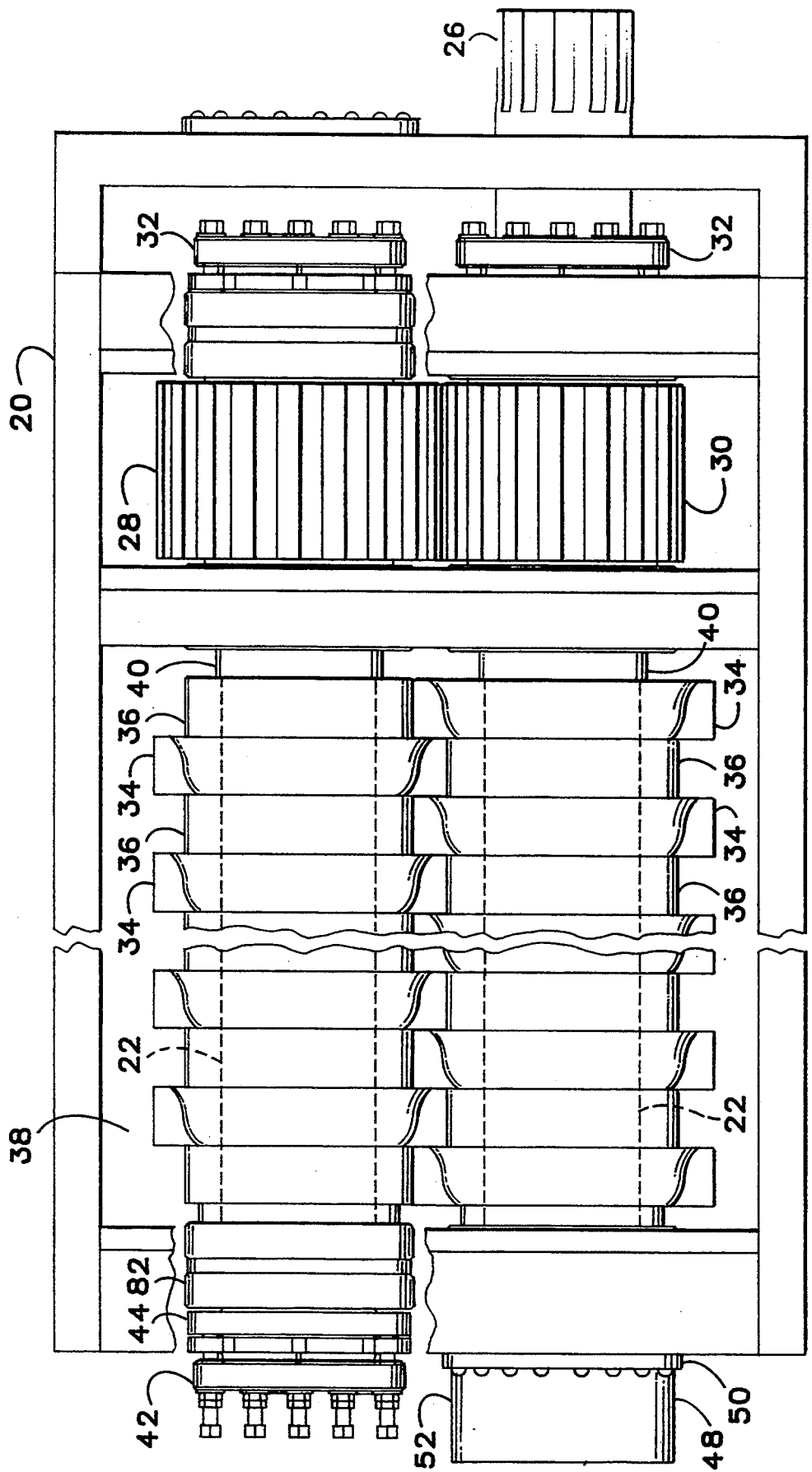
FIG. 2 is a top view of a simplified comminuting machine wherein a portion of the frame is broken away to allow depiction of a preferred embodiment of the preload clamp nut device of the present invention.

FIG. 2 shows a simplified comminuting machine comprising a frame 20 that supports a pair of parallel shafts 22 that are arranged horizontally and are rotatable within the frame 20 by means of bearings between the shafts and the frame. One shaft is provided with a spline portion 26 for connection to a motor (not shown) to provide rotational motion. The splined shaft provides rotational motion to the other shaft by means of gears 28 and 30. The gears 28, 30 are prevented from longitudinally moving along respective shafts 22 by a clampnut 32 that is securely clamped to the shafts 22.

Trash that is deposited into a comminuting chamber 38 between the shafts 22 is pulverized by a plurality of comminuting blades 34 and spacers 36 which are disposed along the shafts 22. The comminuting blades 34 and spacers 36 are keyed to shafts 22 for rotation therewith. As used herein, and for purposes of claim construction, all shaft-mounted members including, but not limited to, comminuting blades, spacers, and bearings shall commonly be referred to as "tools." The particulars of the comminuting mechanism and the disposition of the tools along the shafts is not relevant to an understanding of the present invention except that it should be understood that the tools which are disposed along the shafts 22 must be continuous with no intervening space between tools.

At one end of the comminuting chamber 38 the shafts 22 are provided with a shoulder 40 that acts as an abutment to prevent the longitudinal sliding of the blades and spacers toward that end of the chamber. At the other end of the comminuting chamber 38 a preload-clampnut 42 is secured to each shaft to prevent longitudinal sliding of the blades and spacers toward that end of the chamber and to provide a preload against a bearing spacer 44 which abuts a bearing 46. Since the bearing spacer 44 and bearing 46 are free to slide along a respective shaft 22, a preload placed on the bearing spacer by the preload-clampnut 42 is transferred to the plurality of comminuting blades 34 and spacers 36 that are disposed along a respective shaft 22.

A tubular housing 48 having a flange 50 is disposed around the preload-clampnut 42 and secured to the frame 20 to provide a protective covering over the preload-clampnut while still providing access to the parts of the preload-clampnut for adjustment as will be described herein.

With respect to FIGS. 3–4, a preferred embodiment of the preload-clampnut device of the present invention will be described in detail. The preload-clampnut comprises a sleeve 60, a clamp ring 62 and a plurality of bolts 64. The sleeve 60 has a threaded bore 66 and a tapered exterior surface 68. A plurality of slits 70 extend through the sleeve wall from the threaded bore 66 to the tapered surface 68 and along a portion of the length of the sleeve beginning at one end thereof. The slits 70 are provided to allow the sleeve to be circumferentially constricted. The sleeve is also provided with a flange 72 that has a plurality of threaded holes 74 for receiving the bolts 64. The threaded holes 74 are disposed in a predetermined pattern circumferentially around the sleeve. The outer periphery of the flange 72 is provided with a plurality of slots 76 so that a spanner wrench may be used to tighten the sleeve onto a threaded terminal portion 73 of the shafts 22.

The clamp ring 62 has a tapered bore 78 that is compatible with the tapered surface 68 of the sleeve 60. That is, relative to a longitudinal axis, the angle of taper of bore 78 is substantially equal to the angle of taper of the sleeve's tapered surface 68. The clamp ring 62 has a plurality of openings 80 that are disposed circumferentially around the clamp ring 62 in the same predetermined pattern as the threaded holes 74 in the flange 72. Thus, when the clamp ring 62 is disposed over the tapered surface 68 of the sleeve the openings 80 align with the threaded hole 74 so as to receive a bolt 64 through the opening 80 into the threaded hole 74. When the clamp ring 62 is drawn towards the sleeve flange 72 by bolts 64 the force of the tapered bore 78 against the tapered surface 68 causes the sleeve bore 66 to circumferentially constrict by partially closing the slits 70.

Each bolt 64 comprises a threaded shaft 88 that may be screwed into the threaded hole 74, a head 90, a set nut 92 and a lock nut 94. The bolt 64 loads the collar 62 against the sleeve 60 to clamp the preload-clampnut onto the shaft 22 and also loads the preload-clampnut against the bearing spacer 44.

The installation and operation of the preload clamp nut will now be explained with particular reference to FIG. 3. After the plurality of comminuting blades 34 and spacers 36 have been mounted onto the shaft 22, a bearing 82 and bearing spacer 44 are slid onto the end of the shaft and pushed up firmly against the plurality of tools already on the shaft. Next, the sleeve is threaded onto the threaded portion 73 of the shaft and tightened against the bearing spacer 44 by hand or with a spanner wrench. The clamp ring 62 is then placed over the tapered surface 68 and a bolt 64 is inserted through a tab washer 84 and through each opening 80 in the clamp ring 62 into an aligned threaded hole 74 in the flange 72. All the bolts 64 are inserted and threaded into the threaded holes an equal amount. The set nuts 92 are then tightened against the tab washer 84 thereby drawing the clamp ring toward the flange 62 so that the tapered bore 78 of the clamp ring forces the tapered surface 68 of the sleeve to circumferentially constrict thereby pinching the sleeve against the threaded shaft 22. To ensure an even distribution of loading, the set nuts must be tightened in a predetermined pattern wherein a first set nut is partially tightened and then an adjacent set nut is partially tightened an equal amount and then the next adjacent set nut is partially tightened an equal amount, and so on, until all set nuts have been partially tightened equally. Thereafter, the same pattern is repeated until all set nuts have been fully tightened and the clamp ring 62 is securely loaded against the sleeve 60. The lock nuts 94 should be positioned away from the set nuts 92 at this point.

The preload is then applied by holding each set nut stationary and turning the head 90 of the respective bolt 64 which turns the threaded shaft 88 driving it further through the threaded hole 74 and against the bearing spacer 44. Because the set nut 92 is held stationary while the bolt 64 is turned, the bolt processes through the threads of the set nut 92 at the same rate as it processes through the threads of the threaded hole 74 and maintains a constant dimension between the clamp ring 62 and flange 72 thereby keeping constant the load on the sleeve from the clamp ring. The bolt heads are turned in the same predetermined schedule of tightening as were the set nuts to ensure an even distribution of preloading. When the proper preload has been applied the lock nuts 94 are tightened against the set nuts thereby fixing the bolts into position. In this manner, the bolts 64 serve to load the clamp ring against the sleeve to provide the clamp-nut function as well as loading the preload-clampnut (sleeve and clamp ring combination) against the bearing washer 44 providing the preload function.

By installing the preload clampnut device as described the device is able to establish a very secure attachment to the shaft 22 which provides a stable platform for applying a very large preload against a plurality of shaft-mounted tools. It has been found that the preload which can be generated with the present invention is so great that the plurality of shaft-mounted tools take on the characteristics of a unitary shaft with respect to their response to the forces that occur during operation of the comminuting machine. Because the tools are significantly larger diametrically than the shaft 22, the preload-clampnut device of the present invention causes the tools to perform as a larger, stronger shaft. Thus, the present invention provides a secure attachment to the shaft and a preload which eliminate the problems associated with forces from the comminution process that act in a longitudinal direction and lateral direction.

At the gear end of the shaft 22 the preload clampnut device of the present invention is used with different length bolts, and without set nuts 92 or lock nut 94, to perform the function of a clamp nut alone without providing a preload feature. Using an identical sleeve 60 and clamp ring 62 as described above, the sleeve 60 is threaded onto the end of the shaft 22 and tightened against a bearing or spacer by means of a spanner wrench. Thereafter, the clamp ring 62 is inserted over the sleeve and bolts are inserted through the openings 80 and into the threaded hole 74. The shortened bolts are then tightened and the clamp ring 62 is drawn towards the flange thereby circumferentially squeezing the tapered surface 68 of the sleeve pinching it against the threaded shaft 22.

An alternative embodiment of the present invention, shown in FIGS. 5 and 6, uses a nonthreaded shaft having a circumferential groove 112 and a preload-clampnut comprising a flange 100 and multi-piece lock ring 102. The flange 100 has a two-portion bore with a tapered portion 104 and a constant-diameter portion 106. The flange 100 is further provided with a plurality of threaded holes 108 for receiving an equal plurality of bolts 110.

The lock ring is made as a unitary annular ring having beveled exterior edges 114 that form two tapered surface portions 116. The tapered surface portions 116 are cut at an angle to the longitudinal axis that is substantially equal to a similarly referenced angle of the tapered bore portion 104. The lock ring 102 has an inwardly-extending annular lip 118 whose dimensions permit the lip to be inserted into the groove 112. The inwardly-extending lip 118 is symmetrically dimensioned so that the lock ring pieces may be inserted into the groove 112 such that the lock ring 102 extends away from the end of the shaft 22 as shown in FIG. 5, as shown in region A, or the inwardly-extending lip 118 may be inserted into the groove 112 so that the lock ring 102 extends towards the end of the shaft 22, as shown in region B. Furthermore, since the lock ring 102 has identical beveled edges 114 creating identically tapered surfaces 116 the lock ring interfaces with the flange 100 in an identical manner regardless of its orientation. The difference between inserting the lock ring 102 extending away from, or towards, the end of the shaft is that it displaces the longitudinal position of the flange 100 by some predetermined amount of longitudinal displacement 120 to accommodate variations in tool width.

The alternative embodiment of the preload-clampnut comprising the flange 100 and lock ring 102 is installed on the grooved shaft 22 as follows. A plurality of bolts 110 having a lock nut 122 is inserted into the threaded holes 108 in the flange and the flange with bolts is then slid over the end of the shaft 22 past the groove 112. The pieces of the lock ring 102 are then set in the groove 112. Next, the bolts 110 are turned so that the bolts press against the bearing spacer 44 which moves the flange 100 outward until it comes into contact with the lock ring 102. Additional turning of the bolts 110 establishes a preload against the bearing spacer 44. The bolts are tightened in the bolt tightening pattern previously described. The preload created by bolts 110 pressing against the bearing spacer 44 is resisted by the lock ring 102. The tapered portion 104 of the flange impinges upon the tapered surface 116 of the lock ring 102 thereby tending to circumferentially compress the pieces of the lock ring onto the shaft and into the groove 110.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A preload-clampnut device that securely attaches to an elongate shaft having longitudinal and radial directions and wherein the device provides a load against a tool mounted on said shaft, the device comprising:

(a) a sleeve that defines a bore that receives said shaft; and (b) loading means for compressing said sleeve in the radial direction against said shaft and for loading said device in the longitudinal direction against said tool.

2. The preload-clampnut of claim 1 wherein said loading means comprises:
   (a) said sleeve having an exterior surface with a tapered portion, said sleeve further defining at least one slit that extends between said bore and said exterior surface along at least a portion of said tapered portion; and
   (b) a clamp ring that defines a tapered bore that is compatible with said tapered portion.

3. The preload-clampnut device of claim 2 wherein said sleeve has a flange that defines a plurality of threaded holes arranged in a predetermined pattern.

4. The preload-clampnut device of claim 3 wherein said clamp ring further defines a plurality of openings arranged in said predetermined pattern.

5. The preload-clampnut device of claim 4 wherein said loading means further comprises a plurality of bolts threadingly engageable with said threaded holes, each said bolt comprising a set nut that, when rotated, loads said tapered bore against said tapered portion thereby compressing said sleeve in said radial direction against said shaft, a head that, when rotated, creates a load against said tool in the longitudinal direction, and a lock nut.

6. The preload-clampnut device of claim 5, further comprising a grip means for holding said set nut in a fixed position relative to said clamp ring.

7. The preload-clampnut device of claim 1, further comprising a clip that attaches to said shaft in a first orientation and retains said sleeve at a first location along said shaft and said clip can attach to said shaft in a second orientation to retain said sleeve at a second location along said shaft.

8. The preload-clampnut device of claim 1 wherein said sleeve bore is threaded and said shaft has a threaded portion for receiving said threaded sleeve bore.

9. The preload-clampnut device of claim 8 wherein said sleeve has a flange with an outer periphery that defines a plurality of notches.

10. A preload device for providing a load against a tool on an elongate shaft, the device comprising:
    (a) a sleeve that defines a bore and has a flange that defines a plurality of threaded holes arranged in a pattern;
    (b) a clamp ring that defines a plurality of openings arranged in said pattern; and
    (c) loading means for loading said clamp ring against said sleeve thus loading said sleeve in a radial direction against said shaft and loading said device in a longitudinal direction against said tool.

11. The preload device of claim 10 wherein said loading means is a plurality of bolts threadingly engageable with said threaded holes, each said bolt comprising a set nut that, when rotated, loads said clamp ring in a radial direction against said sleeve, a head that, when rotated, loads said device in the longitudinal direction against said tool, and a locknut.

12. The preload device of claim 11, further comprising a grip means for holding said set nut in a fixed position relative to said clamp ring.

13. The preload device of claim 12, further comprising a clip that attaches to said shaft and retains said sleeve at a predetermined location along said shaft.

14. The preload device of claim 12 wherein said sleeve bore is threaded and said shaft has a threaded portion for receiving said threaded sleeve bore.

15. The preload device of claim 14 wherein said flange has an outer periphery that defines a plurality of notches.

16. A preload device for providing a load against a tool on an elongate shaft, the device comprising:
    (a) a flange that defines a bore having a first portion and a second portion wherein said first portion is a constant diameter bore and said second portion is a tapered bore, said flange further defining a plurality of threaded holes;
    (b) a lockring that defines a bore and further defines an exterior surface having a tapered portion that is matingly compatible with said tapered bore; and
    (c) a bolt having threads that are matingly compatible with said threaded holes in said flange and said bolt further comprising a nut for locking said bolt into position relative to said flange; and
    (d) loading means for loading said flange in a longitudinal direction against said tool when said tapered portion is mated with said tapered bore whereby said lockring provides a reaction force against said flange equal and opposite to said load force on said flange by said tool.

* * * * *